(12) United States Patent
Narayanan Nampy et al.

(10) Patent No.: US 10,676,171 B2
(45) Date of Patent: *Jun. 9, 2020

(54) STRUCTURAL PANEL WITH SPLICE JOINT BETWEEN ADJACENT CORE STRUCTURES

(71) Applicant: Rohr, Inc., Chula Vista, CA (US)

(72) Inventors: Sreenivas Narayanan Nampy, San Diego, CA (US); David M. Adams, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/681,031

(22) Filed: Aug. 18, 2017

(65) Prior Publication Data

US 2019/0054999 A1 Feb. 21, 2019

(51) Int. Cl.
*B64C 1/40* (2006.01)
*B64D 29/00* (2006.01)
*B64D 33/02* (2006.01)

(52) U.S. Cl.
CPC ............... *B64C 1/40* (2013.01); *B64D 29/00* (2013.01); *B64D 2033/0206* (2013.01)

(58) Field of Classification Search
CPC .................................. B64C 1/40; B64D 29/00
USPC .......................................................... 181/292
See application file for complete search history.

(56) References Cited

U.S. PATENT DOCUMENTS

| | | | | |
|---|---|---|---|---|
| 5,041,323 A * | 8/1991 | Rose | ............ | B32B 3/12 428/116 |
| 5,923,003 A * | 7/1999 | Arcas | ............ | B64C 21/04 181/213 |
| 8,047,326 B2 * | 11/2011 | Valleroy | ............ | G10K 11/172 181/210 |
| 8,469,146 B2 * | 6/2013 | Bornert-Dano | ............ | B64F 5/00 181/284 |
| 9,761,216 B2 * | 9/2017 | Nampy | ............ | G10K 11/172 |
| 2013/0292202 A1 * | 11/2013 | Moutier | ............ | B29C 73/04 181/292 |
| 2013/0313039 A1 * | 11/2013 | Comon | ............ | B23K 9/16 181/292 |
| 2014/0034417 A1 * | 2/2014 | Ayle | ............ | F02C 7/045 181/292 |
| 2014/0367512 A1 * | 12/2014 | Dean | ............ | B64C 1/40 244/1 N |

(Continued)

FOREIGN PATENT DOCUMENTS

| | | |
|---|---|---|
| CN | 105128412 | 8/2015 |
| EP | 2896498 A1 | 7/2015 |
| GB | 1406844 A | 9/1975 |

*Primary Examiner* — Forrest M Phillips
(74) *Attorney, Agent, or Firm* — Getz Balich LLC

(57) ABSTRACT

A structural panel is provided that includes a first core structure and a second core structure. The second core structure includes a plurality of core components, which components includes a corrugated ribbon, a first wall and a second wall. The corrugated ribbon includes a plurality of baffles and a plurality of porous septums. The baffles and the porous septums are laterally between and connected to the first wall and the second wall. Each of the porous septums are longitudinally between a respective adjacent pair of the baffles. A first of the core components projects longitudinally into and/or along the first core structure at a splice joint between the first core structure and the second core structure.

20 Claims, 15 Drawing Sheets

(56) References Cited

U.S. PATENT DOCUMENTS

2015/0367953 A1 12/2015 Yu et al.
2016/0144592 A1* 5/2016 Douglas .................... B32B 3/12
428/116

* cited by examiner

STRUCTURAL PANEL WITH SPLICE JOINT BETWEEN ADJACENT CORE STRUCTURES

BACKGROUND

1. Technical Field

This disclosure relates generally to structural panels and, more particularly, to structural panels for attenuating sound generated by, for example, an aircraft propulsion system.

2. Background Information

A structural panel may be configured to attenuate sound generated by an aircraft propulsion system. Various structural panel types and configurations are known in the art. While these known structural panels have various advantages, there is still room in the art for improvement.

SUMMARY OF THE DISCLOSURE

According to an aspect of the present disclosure, a structural panel is provided that includes a first core structure and a second core structure. The second core structure includes a plurality of core components, which components include a corrugated ribbon, a first wall and a second wall. The corrugated ribbon includes a plurality of baffles and a plurality of porous septums. The baffles and the porous septums are laterally between and connected to the first wall and the second wall. Each of the porous septums are longitudinally between a respective adjacent pair of the baffles. A first of the core components projects longitudinally at least one of into or along the first core structure at a splice joint between the first core structure and the second core structure.

According to another aspect of the present disclosure, a method is provided for forming a structural panel. During this method, a first core structure and a second core structure are provided. The second core structure includes a plurality of core components, which components include a corrugated ribbon, a first wall and a second wall. The corrugated ribbon includes a plurality of baffles and a plurality of porous septums. The baffles and the porous septums are laterally between and connected to the first wall and the second wall. Each of the porous septums are longitudinally between a respective adjacent pair of the baffles. The second core structure is attached to the first core structure at a splice joint, where a first of the core components projects longitudinally at least one of into or along the first core structure.

The method may also include steps of: bonding a perforated first skin to the first core structure and the second core structure; and bonding a second skin to the first core structure and the second core structure, wherein the first core structure and the second core structure are vertically between the perforated first skin and the second skin.

The first core structure may have a different configuration than the second core structure.

The second core structure may be configured with a plurality of resonance chambers. Each of the resonance chambers may extend laterally between the first wall and the second wall. Each of the resonance chambers may extend longitudinally between a respective adjacent pair of the baffles. Each of the resonance chambers may be divided into a pair of sub-cavities by a respective one of the porous septums.

The structural panel may also include a perforated first skin and a second skin. The first core structure and the second core structure may each be disposed vertically between and attached to the perforated first skin and the second skin.

The first of the core components may be configured as or otherwise include the first wall.

The first wall may be disposed within one or more cavities of the first core structure. The first wall may be bonded to one or more components of the first core structure that at least partially form the one or more cavities.

The core components may further include a perimeter wall. The first wall may include a lateral jog and a longitudinal projection. The lateral jog may form a laterally extending section of the perimeter wall. The longitudinal projection may project longitudinally into the first core structure.

The second wall may project longitudinally into the first core structure at the splice joint.

The second wall may not project into the first core structure at the splice joint.

The core components may further include a second corrugated ribbon and a third wall that projects longitudinally into the first core structure at the splice joint. The second corrugated ribbon may include a plurality of second baffles and a plurality of second porous septums. The second baffles and the second porous septums may be laterally between and connected to the second wall and the third wall. Each of the second porous septums may be longitudinally between a respective adjacent pair of the second baffles.

The first wall may project longitudinally into the first core structure for a first distance. The core components may further include a plurality of parallel walls that include the first wall and the second wall. One of the parallel walls may project longitudinally into the first core structure at the splice joint for a second distance that is different than the first distance.

The first wall may project longitudinally into the first core structure for a first distance. The core components may further include a plurality of parallel walls that include the first wall and the second wall. One of the parallel walls may project longitudinally into the first core structure at the splice joint for a second distance that is equal to the first distance.

The first wall may include one or more cantilevered branches disposed within the first core structure.

The first of the core components may be configured as or otherwise include the corrugated ribbon.

The corrugated ribbon may further include a projection. The projection may project out from one of the baffles or one of the septums. The projection may extend longitudinally along the first core structure.

The core components may further include a perimeter wall. The corrugated ribbon may further include a jog and a projection. The jog may extend vertically along the perimeter wall and/or may be connected to one of the baffles or one of the septums. The projection may project longitudinally out from the jog and along the first core structure.

The core components may further include a perimeter wall. The corrugated ribbon may further include a first jog, a second jog and a projection. The first jog may extend vertically along a first side of the perimeter wall and/or may be connected to one of the baffles or one of the septums. The second jog may extend along a second side of the perimeter wall and/or may be connected between the first jog and the projection. The projection may project longitudinally out from the second jog and along the first core structure.

An aperture may extend vertically through a central portion of the first core structure and the second core structure may be disposed within the aperture.

The foregoing features and the operation of the invention will become more apparent in light of the following description and the accompanying drawings.

DETAILED DESCRIPTION

Figure 1:
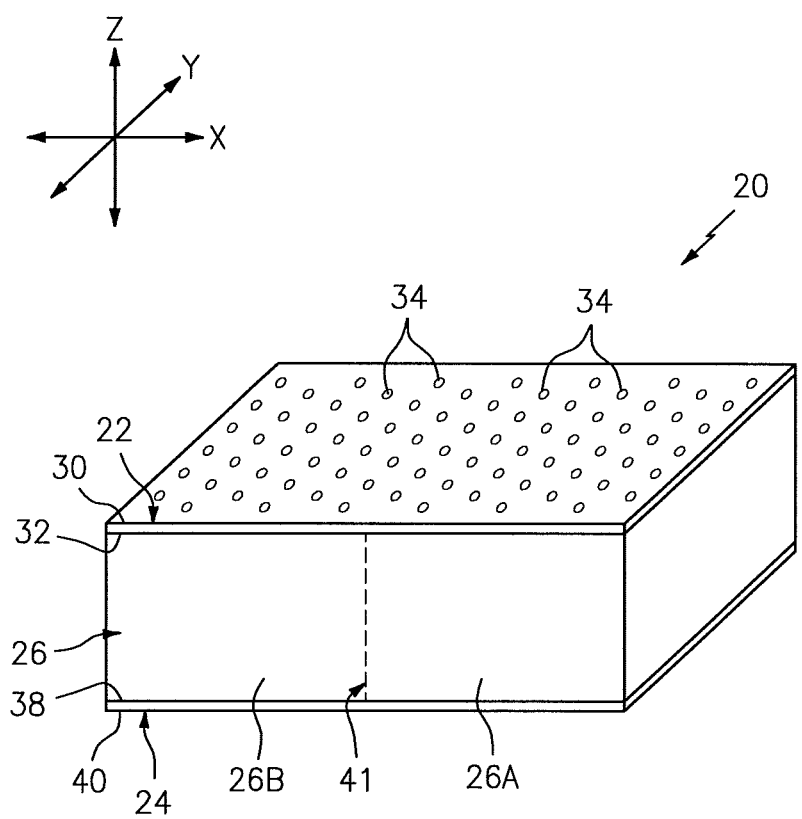
FIG. 1 is a schematic perspective illustration of an acoustic structural panel.

FIG. 1 schematically illustrates an exemplary structural panel 20 configured as an acoustic sound attenuating panel. This structural panel 20, for example, may be configured to attenuate noise generated by an aircraft propulsion system such as, for example, a turbofan propulsion system or a turbojet propulsion system. With such a configuration, the structural panel 20 may be configured to form part of a nacelle of the propulsion system. The structural panel 20, for example, may be configured as or with an inner or outer barrel, a translating sleeve, a blocker door, etc. Alternatively, the structural panel 20 may be configured with another component/structure of the aircraft such as its fuselage or a wing. Furthermore, the structural panel 20 may be configured to also or alternatively attenuate aircraft related noise other than that generated by the propulsion system. The structural panel 20 of the present disclosure, however, may alternatively be configured for non-aircraft applications and/or non-sound suppression applications.

The structural panel 20 of FIG. 1 extends longitudinally along an x-axis. The structural panel 20 extends laterally along a y-axis. The structural panel 20 extends vertically along a z-axis. Note, the tetra "vertical" is used herein to describe a depthwise panel direction and is not limited to a gravitational up/down direction. Furthermore, for ease of illustration, the x-y plane is shown as a generally flat plane of FIG. 1. However, in other embodiments, the x-y plane and, thus, the structural panel 20 may be curved and/or follow an undulating geometry; e.g., complex 3D curvature. For example, the x-y plane and, thus, the structural panel 20 may be arcuate, cylindrical, conical, or tapered with or without radial undulations. In such embodiments, the vertical direction (e.g., the z-axis) is defined relative to a position of interest on the x-y plane. For example, on a spherical x-y plane, the vertical direction (e.g., the z-axis) is a radial direction.

The structural panel 20 includes a porous first skin 22, a solid non-porous second skin 24 and a cellular multi-segment core structure 26. Note, the term "porous" is used herein to describe a body with perforations and/or open cell pores that enable flow of gas as well as sound waves through the body. The term "non-porous" is used herein to describe a body with a configuration that prevents flow of gas through the body; e.g., a body without perforations or open cell pores.

Briefly, the multi-segment core structure 26 is disposed and extends vertically between the first skin 22 and the second skin 24. The multi-segment core structure 26 is also connected to the first skin 22 and the second skin 24. The multi-segment core structure 26, for example, may be welded, brazed, fused, adhered or otherwise bonded to the first skin 22 and/or the second skin 24.

The first skin 22 may be configured as a relatively thin sheet or layer of material that extends laterally and longitudinally along the x-y plane. This first skin material may include, but is not limited to, a metal, a polymer (e.g., thermoplastic or theauoset), a fiber reinforced matrix (e.g., fiberglass composite, carbon fiber composite, aramid fiber composite, etc.), or a combination thereof. The first skin 22 extends vertically between opposing side surfaces 30 and 32. The first skin 22 includes a plurality of perforations 34; e.g., apertures such as through-holes. Each of these perforations 34 extends generally vertically through the first skin 22 between the side surfaces 30 and 32. However, in other embodiments, the first skin 22 may be configured without the perforations 34 where, for example, the structural panel 20 is not configured also for sound attenuation.

The second skin 24 may be configured as a relatively thin sheet or layer of (e.g., continuous and uninterrupted) material that extends laterally and longitudinally along the x-y plane. This second skin material may include, but is not limited to, a metal, a polymer (e.g., thermoplastic or thermoset), a fiber reinforced composite (e.g., fiberglass composite, carbon fiber composite, aramid fiber composite, etc.), or a combination thereof. The second skin material may be the same as or different than the first skin material. The second skin 24 extends vertically between opposing side surfaces 38 and 40.

The multi-segment core structure 26 extends laterally and longitudinally along the x-y plane. The multi-segment core structure 26 extends vertically between opposing core sides, which core sides are abutted against the side surface 32 of the first skin 22 and side surface 38 of the second skin 24.

The multi-segment core structure 26 includes at least a first segment and a second segment. Each of these segments is formed as a discrete core structure 26A, 26B. These discrete core structures 26A and 26B are then attached (e.g., bonded) to one another at a splice joint 41 (or multiple splice joints) to provide the multi-segment core structure 26. Various splicing techniques may be used for attaching the first core structure 26A to the second core structure 26B and are discussed below in further detail after a general discussion of exemplary first and second core structures 26A and 26B.

Figure 2:
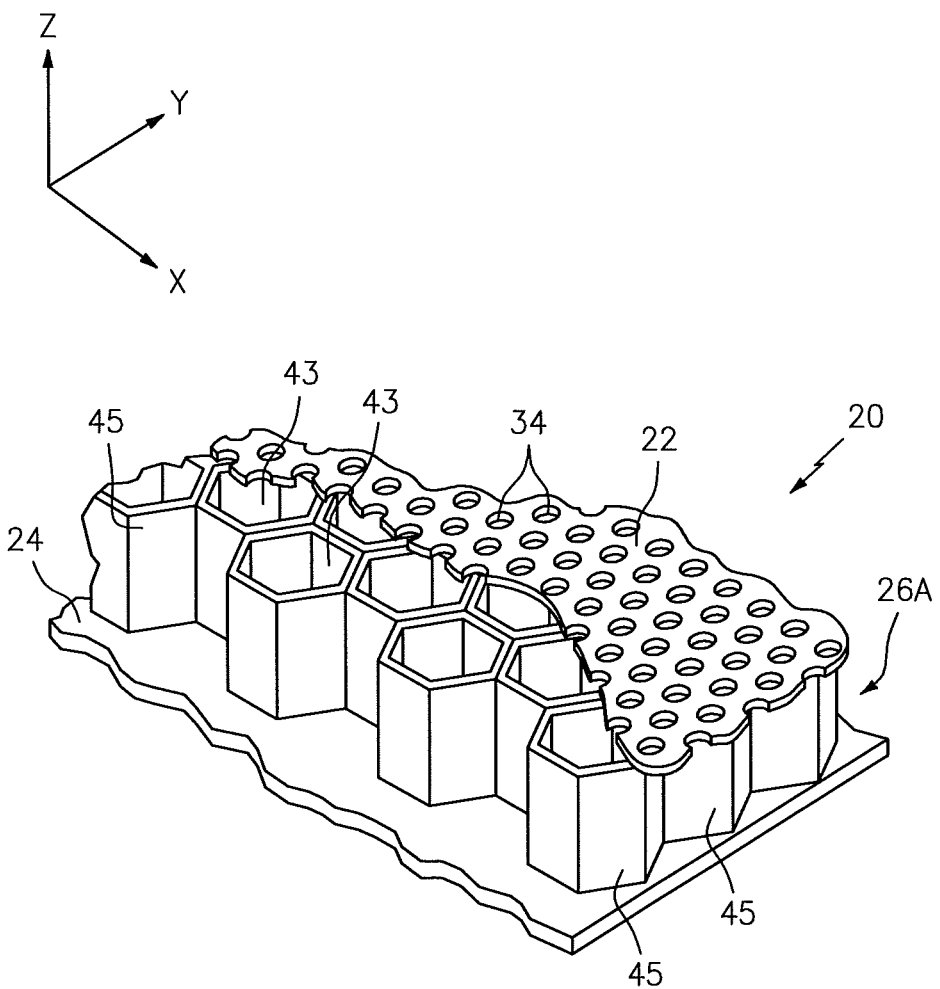
FIG. 2 is a perspective cutaway illustration of a portion of the structural panel with a first core structure.

FIG. 2 is a perspective cutaway illustration of the first core structure 26A. The first core structure 26A may have a hexcore (e.g., honeycomb) configuration with a plurality of cavities 43 (e.g., open cells). The first core structure 26A of FIG. 2, for example, includes a plurality of corrugated sidewalls 45. The sidewalls 45 are arranged together to form the cavities 43, where each cavity 43 has polygonal (e.g., hexagonal) cross-sectional geometry in the x-y plane. Each of the cavities 43 extends through the first core structure 26A between the first skin 22 and the second skin 24. One or more of the cavities 43 thereby are fluidly coupled with an environment surrounding the first skin 22 through one or more of the perforations 34. The present disclosure, however, is not limited to the foregoing exemplary first core structure 26A hexcore configuration. For example, in other embodiments, one or more of the cavities may each have a circular or oval cross-sectional geometry. The first core structure 26A may be a single degree of freedom core structure as shown in FIG. 2, or a multi- (e.g., double) degree of freedom core structure. It is also contemplated that the first core structure 26A has one of various other known cellular/acoustic panel core configurations.

Referring to FIG. 1, the second core structure 26B may have a different configuration than the first core structure 26A. The first core structure 26A, for example, may be configured for enhanced structural stiffness whereas the second core structure 26B may be configured for enhanced low frequency sound attenuation, or sound attenuation of a spectrum of frequencies. This enables the core structure 26 to be tailored to meet different structural and acoustic demands in different areas as discussed below in further detail.

Figure 3:
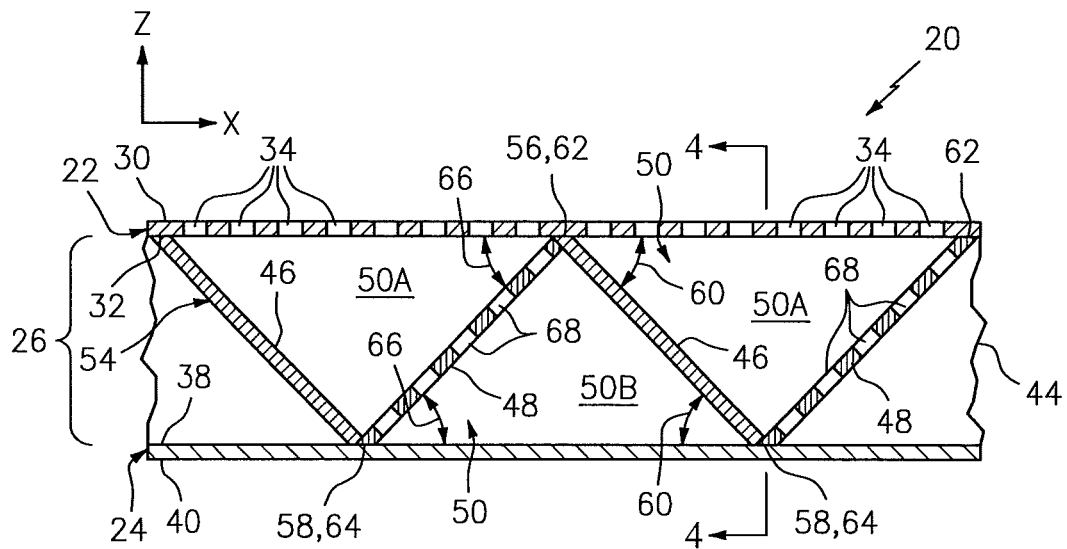
FIG. 3 is a sectional illustration of a portion of the structural panel with a second core structure.
Figure 4:
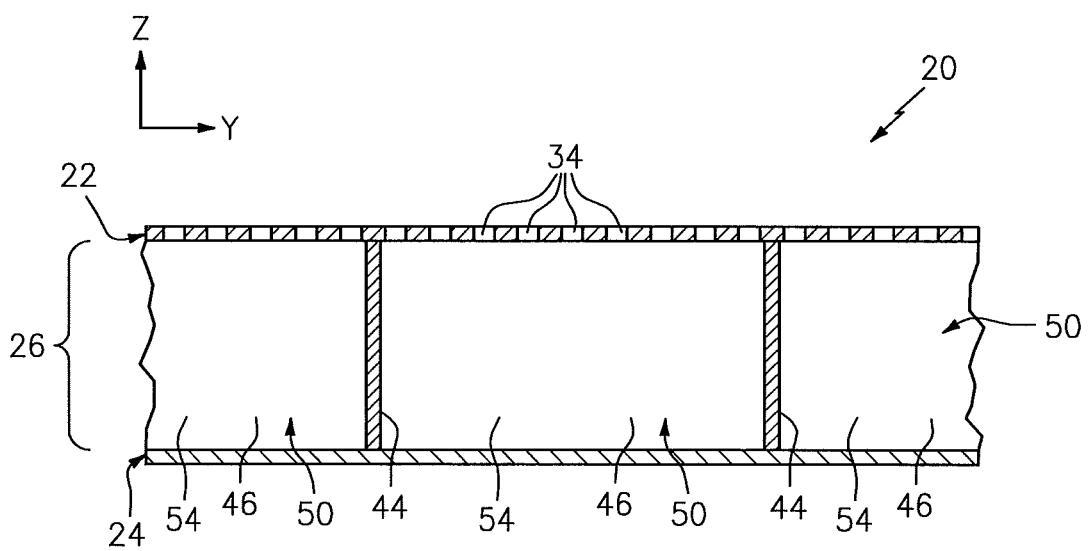
FIG. 4 is a sectional illustration of the structural panel portion of FIG. 2 taken along the line 4-4.
Figure 5:
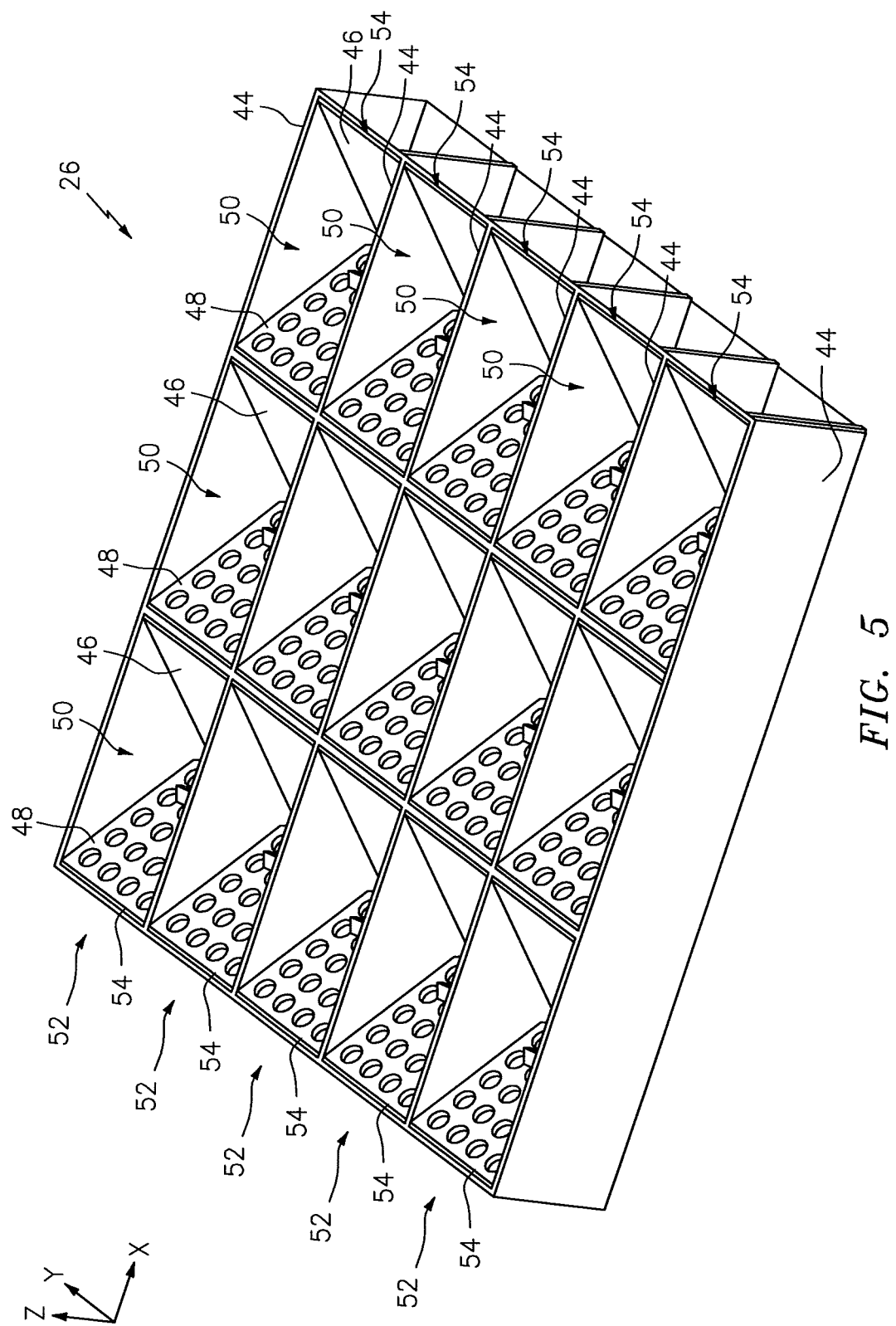
FIG. 5 is a perspective illustration of a portion of the second core structure.

Referring now to FIGS. 3-5, the second core structure of FIGS. 3-5 includes a plurality of non-porous walls 44, a plurality of non-porous baffles 46 and a plurality of porous septums 48. These core components 44, 46 and 48 are arranged together to configure the core structure 26 as an open cavity (e.g., open cell) structure. This open cavity structure forms a plurality of cavities 50 (see also FIG. 7) vertically between the first skin 22 and the second skin 24. These cavities 50 may be arranged in a plurality of linear arrays 52 (see FIG. 5), where each array 52 extends longitudinally along the x-axis and parallel to the non-porous walls 44. Each of the cavities 50 may be fluidly coupled with one or more respective perforations 34 in the first skin 22 (see FIGS. 3 and 4).

Each of the walls 44 may be configured as a (e.g., monolithic) generally planar body, which may be continuous vertically between the first skin 22 and the second skin 24 as well as continuous extending longitudinally along one or more of the cavities 50. Thus, a longitudinal length of each wall 44 may be greater than a vertical height of that same wall 44. The walls 44 may be arranged generally parallel with one another. The walls 44 are laterally spaced from one another so as to respectively form the cavities 50 laterally between adjacent walls 44. With this configuration, laterally adjacent cavities 50 (e.g., cavities 50 in laterally adjacent arrays 52) are also fluidly separated from one another by a respective one of the walls 44.

Each of the walls 44 extends vertically between the first skin 22 and the second skin 24 (see FIGS. 3 and 4). Each of the walls 44 may also be connected (e.g., bonded and/or otherwise) to the first skin 22 and/or the second skin 24. Each of the walls 44 is orientated substantially perpendicular to the first skin 22 and the second skin 24. However, in other embodiments, one or more of the walls 44 may be offset from the first skin 22 and/or the second skin 24 by a non-ninety degree angle; e.g., an acute included angle.

Figure 6:
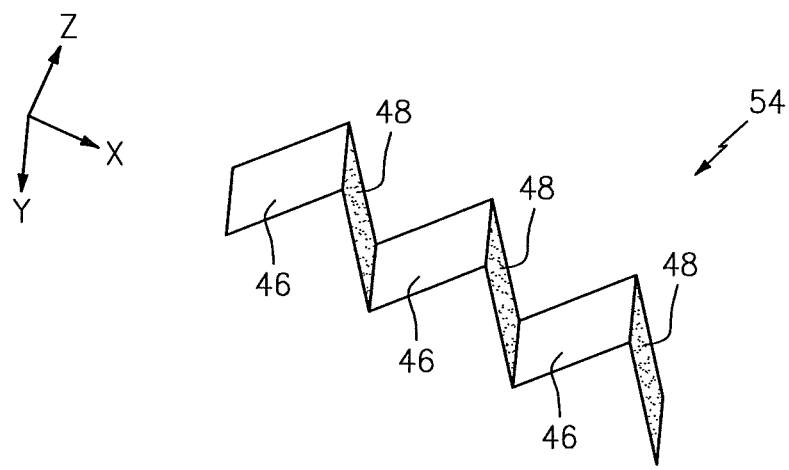
FIG. 6 is a perspective illustration of a corrugated ribbon.

The baffles 46 and the septums 48 are arranged in a plurality of corrugated ribbons 54. An exemplary embodiment of such a corrugated ribbon is shown in FIG. 6. This corrugated ribbon 54 may be configured as a (e.g., monolithic) corrugated body, which may be continuous vertically between the first skin 22 and the second skin 24 as well as continuous extending longitudinally along one or more of the cavities 50. Each corrugated ribbon 54 includes a plurality of the baffles 46 and a plurality of the septums 48. The baffles 46 in each corrugated ribbon are interdisposed with the respective septums 48. More particularly, each of the baffles 46 (unless configured at a longitudinal end of the ribbon 54) is disposed and may extend longitudinally between a respective adjacent pair of the septums 48. Similarly, each of the septums 48 (unless configured at a longitudinal end of the ribbon 54) is disposed and may extend longitudinally between a respective adjacent pair of the baffles 46.

Referring to FIG. 3, one end 56 of each of the baffles 46 is vertically engaged with and/or connected to the first skin 22. An opposing end 58 of each of the baffles 46 is vertically engaged with and/or connected to the second skin 24. Thus, each of the baffles 46 may be angularly offset from the first skin 22 and the second skin 24 by an angle 60; e.g., an acute angle or other (e.g., ninety degree) angle. Similarly, one end 62 of each of the septums 48 is vertically engaged with and/or connected to the first skin 22. An opposing end 64 of each of the septums 48 is vertically engaged with and/or connected to the second skin 24. Thus, each of the septums 48 may be angularly offset from the first skin 22 and the second skin 24 by an angle 66; e.g., an acute angle or other (e.g., ninety degree) angle. In this manner, each corrugated ribbon 54 has a corrugated configuration (see FIG. 6), where one of the baffles 46 and one of the septums 48 may form a single corrugation. Of course, in other embodiments, one or more of the corrugations may each include at least one additional element; e.g., a bridge.

Figure 7:
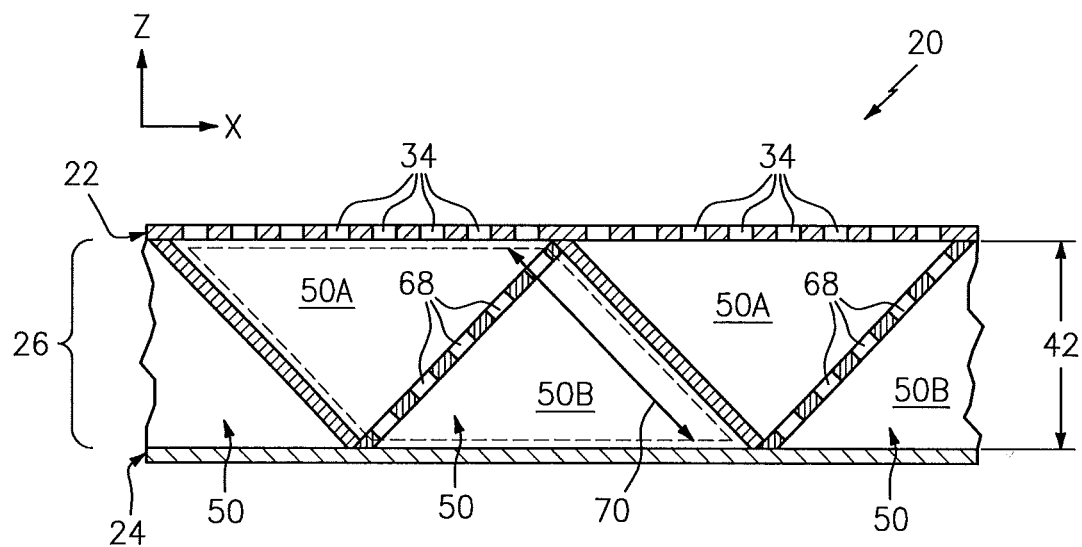
FIG. 7 is another sectional illustration of the structural panel portion of FIG. 3.

Referring to FIG. 7, each of the cavities 50 extends longitudinally between and is formed by an adjacent pair of the baffles 46. Each cavity 50 extends vertically between and formed by the first skin 22 and the second skin 24. Each septum 48 is disposed within and divides a respective one of the cavities 50 into fluidly coupled sub-cavities 50A and 50B. One or more perforations 68 in the septum 48 fluidly coupled the sub-cavities 50A and 50B together.

With the foregoing core configuration, each of the cavities 50 forms a resonance chamber. A length 70 of the resonance chamber extends diagonally between the first skin 22 and the second skin 24 and through a respective one of the septums 48. The effective acoustic length 70 of the resonance chamber therefore is longer than a vertical thickness 42 of the core structure 26. This enables noise attenuation of relatively low frequency noise without increasing the vertical thickness of the structural panel 20. For example, each resonance chamber may receive noise waves through the perforations in the first skin 22. The resonance chamber may reverse the phase of one or more frequencies of those sound waves using known acoustic resonance and noise cancellation principles and subsequently direct the reverse phase sound waves out of the structural panel 20 through the perforations to destructively interfere with other incoming noise waves.

Figure 8:
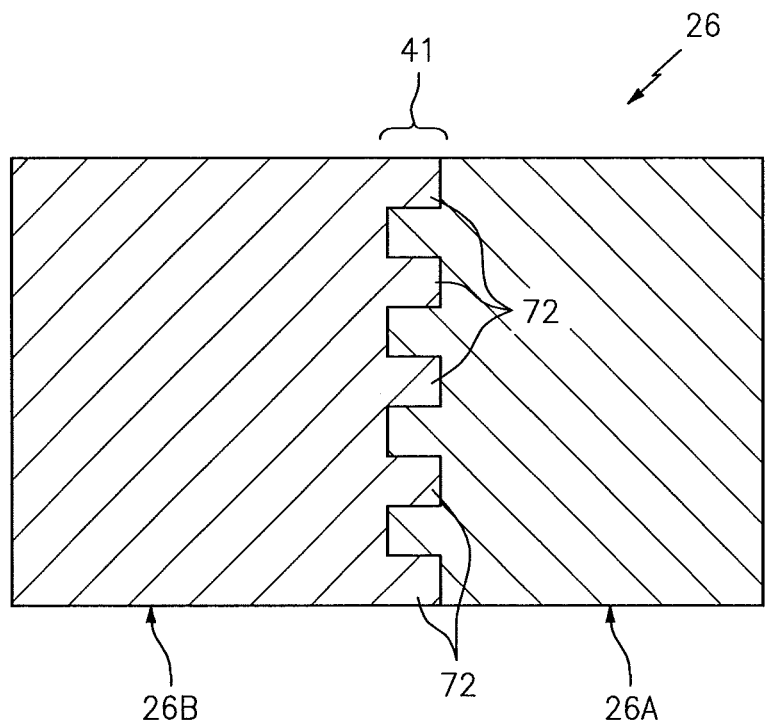
FIG. 8 is schematic illustration of a splice joint between the first core structure and the second core structure.
Figure 9:
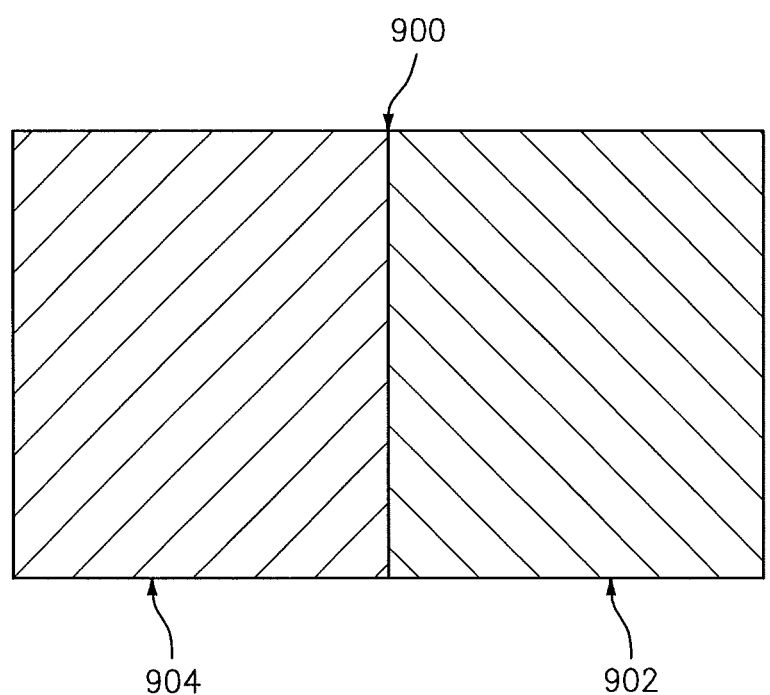
FIG. 9 is a schematic illustration of a butt joint between two core structures.
Figure 10:
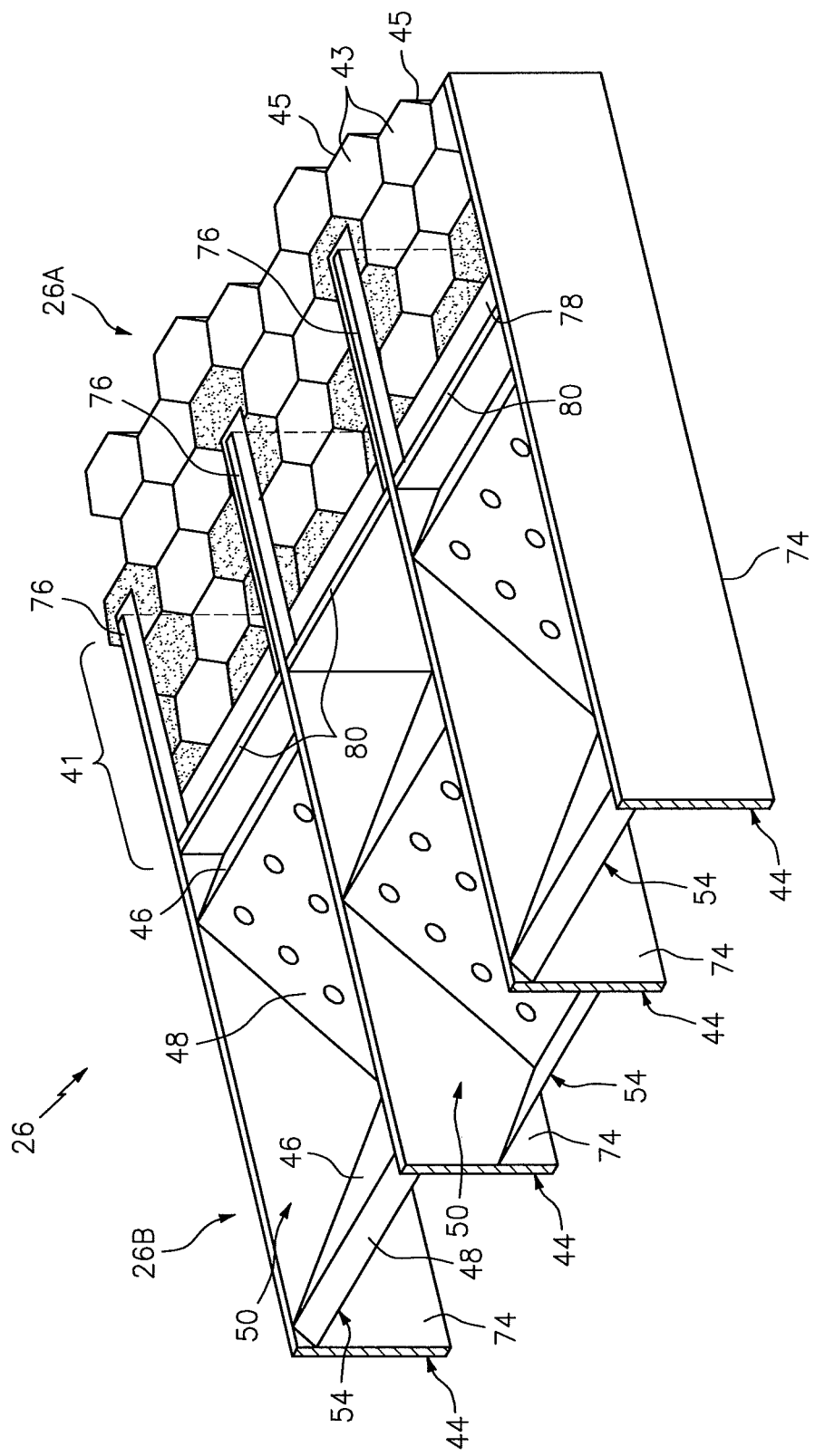
FIGS. 10-18 are partial illustrations of splice joints for various multi-segment core structures.

FIG. 8 is a schematic illustration of the splice joint 41 between the first core structure 26A and the second core structure 26B. At this splice joint 41, one or more core components 72 of the second core structure 26B project longitudinally into and/or longitudinally along a portion of the first core structure 26A. Such a splice joint enables the two discretely formed core structures 26A and 26B to be mechanically interlocked together. In addition, the core components 72 may provide additional surface area for bonding the core structures 26A and 26B together as compared to a butt joint 900 as shown in FIG. 9. In addition, core structures 902 and 904 attached together through the butt joint 900 of FIG. 9 are not mechanically interlocked together. As a result, the splice joint 41 of FIG. 8 may be operable to transfer higher loads between its structures 26A and 26B than the butt joint 900 of FIG. 9. The splice joint 41 of FIG. 8 may also be less prone to failure (e.g., withstand high internal stresses) than the butt joint 900 of FIG. 9.

One or more of the core components 72 of FIG. 8 may each be configured as a wall 44; e.g., see FIGS. 10-15. In addition or alternatively, one or more of the core components 72 may each be configured as a corrugated ribbon 54; e.g., see FIGS. 16-18. Various exemplary embodiments of such configurations are described below with reference to FIGS. 10-18. The present disclosure, however, is not limited to these exemplary splice joints 41. In addition, it is contemplated any one of the splice joint 41 configurations described below may be combined with one or more of the other the splice joint 41 configurations as well as other variations thereof.

In the embodiments of FIGS. 10-15, the core components 72 projecting into the first core structure 26A are configured as the walls 44. For example, referring to FIG. 10, each wall 44 includes a longitudinal base 74 and a longitudinal projection 76. The base 74 is configured to form the cavities 50 within the second core structure 26B. The projection 76 is connected to and projects longitudinally out from the base 74 and into the first core structure 26A. More particularly, the projection 76 projects into a corresponding slot in the first core structure 26A, which slot may extend into or through one or more of the cavities 43. The projection 76 thereby forms a tongue and the slot forms a groove of a tongue and groove type joint. The projection 76 is also adhered or otherwise bonded to one or more of the sidewalls 55 of the first core structure 26A. For example, an expanding adhesive 78 may be injected into the cavities 43 in which the projection 76 is disposed. This expanding adhesive 78 may also be used to adhere a perimeter wall 80 of the second core structure 26B to perimeter portions of the sidewalls 55. Of course, other types of adhesives and/or other bond joints may be used to attach the core structures 26A and 26B together.

Figure 11:
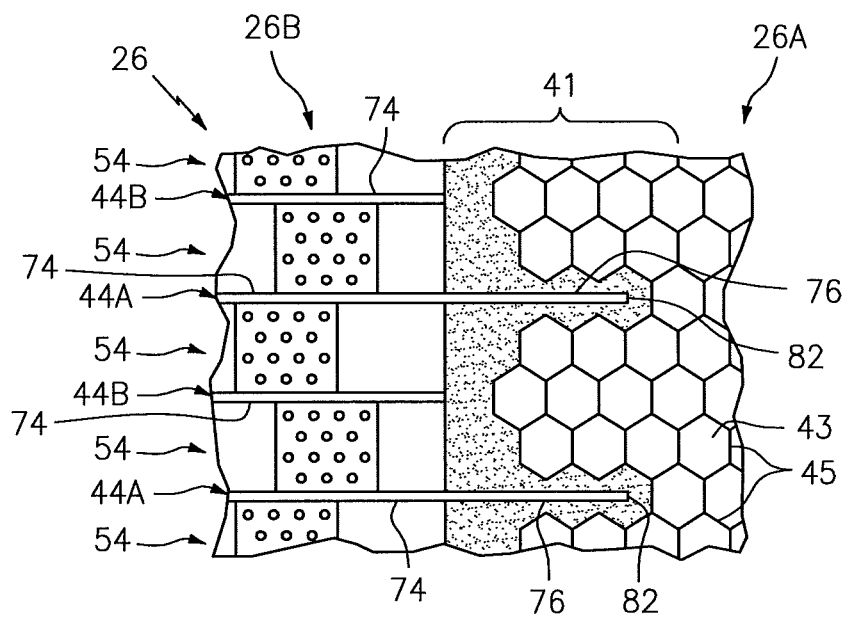
Figure 12:
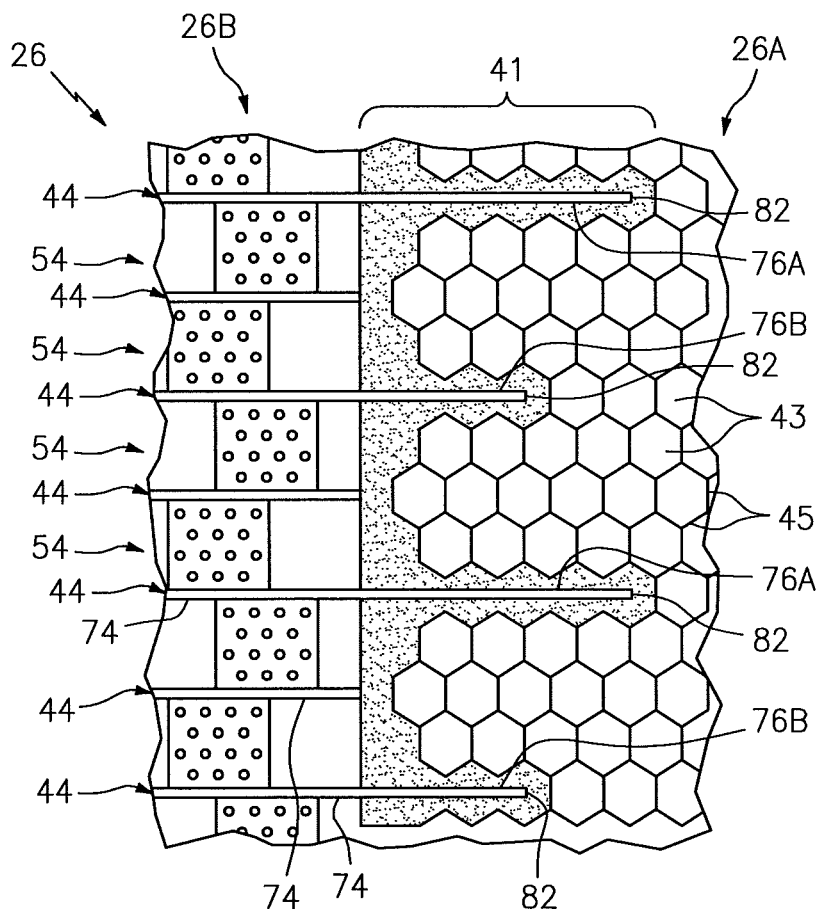
Figure 13:
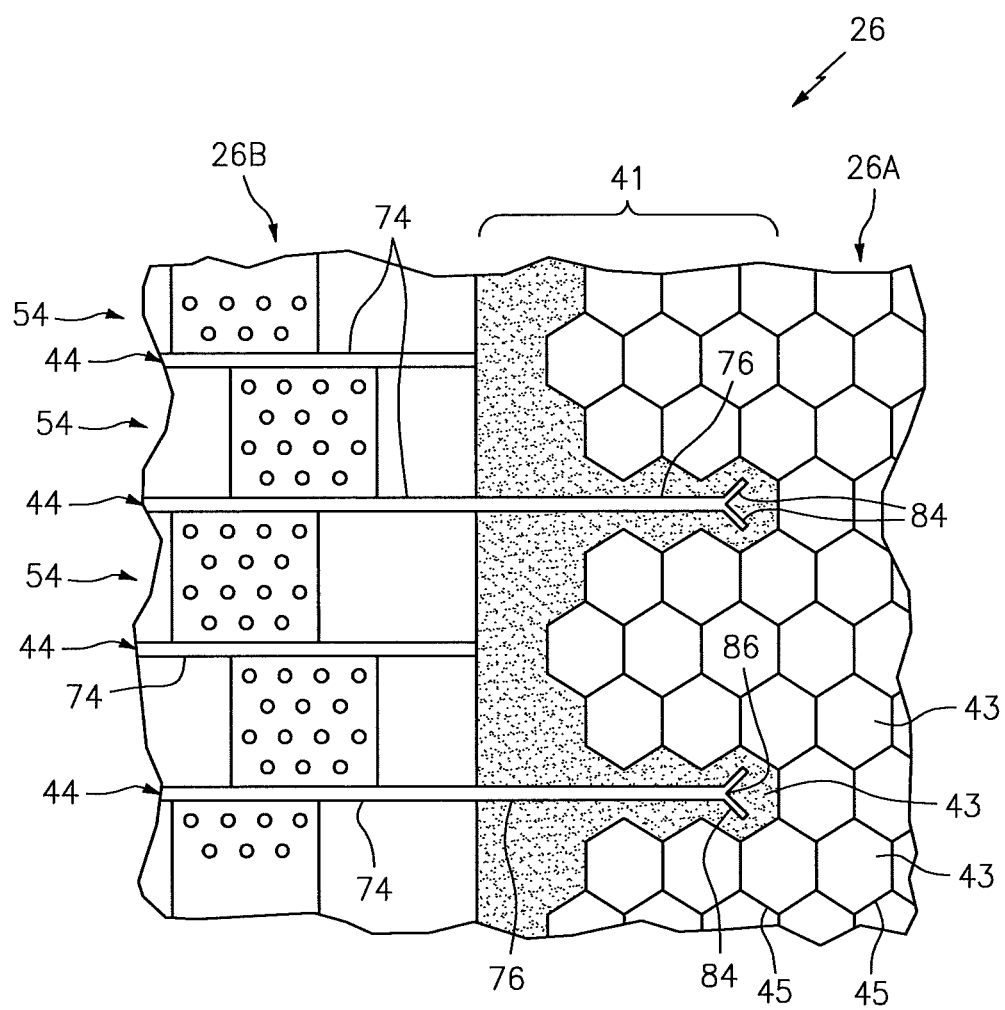

Referring to FIG. 11, a select subset of the walls (e.g., 44A) are configured with both the base 74 and the projection 76. The other remaining walls (e.g., 44B) are not configured with the projection 768 and, thus, do not project longitudinally into the first core structure 26A at the splice joint 41. In the embodiment of FIG. 11, a longitudinal length of each projection 76 is the same. However, in the embodiment of FIG. 12, some of the projections (e.g., 76A) have a longitudinal length that is different (e.g., greater) than a longitudinal length of the other projections (e.g., 76B). It is contemplated such an alternating arrangement may also be used where each of the walls 44 is configured with a projection 76.

Referring again to FIG. 11, each of the projections 76 may project longitudinally to a distal end tip 82. Alternatively, referring to FIG. 13, one or more of the walls 44 may also each include one or more cantilevered branches 84 disposed within at least one of the cavities 43. These branches 84 may project laterally out from the projection 76, for example, proximate a distal end 86 thereof. The branches 84 are operable to provide further mechanical interlocking as well as additional bonding surface area.

Figure 14:
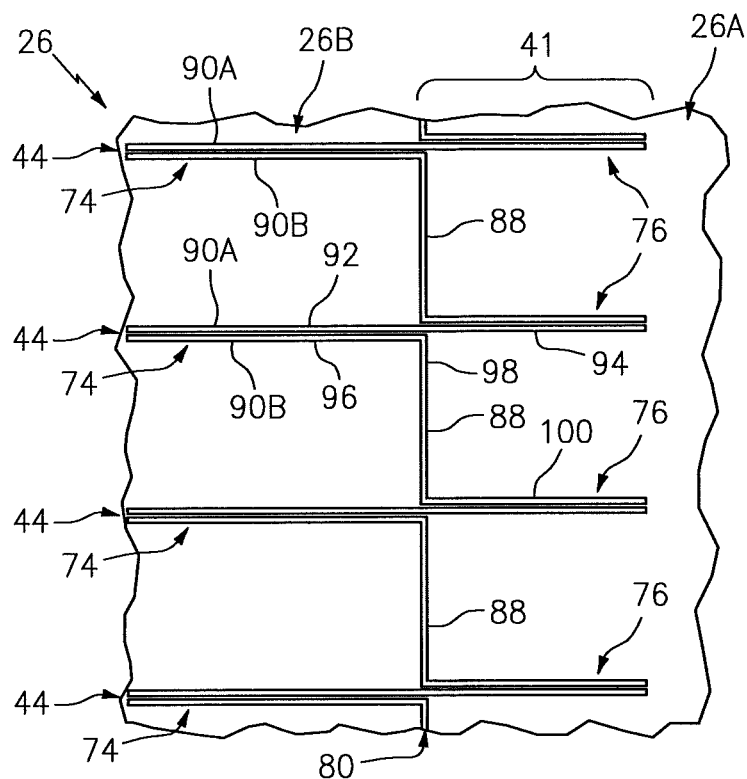
Figure 15:
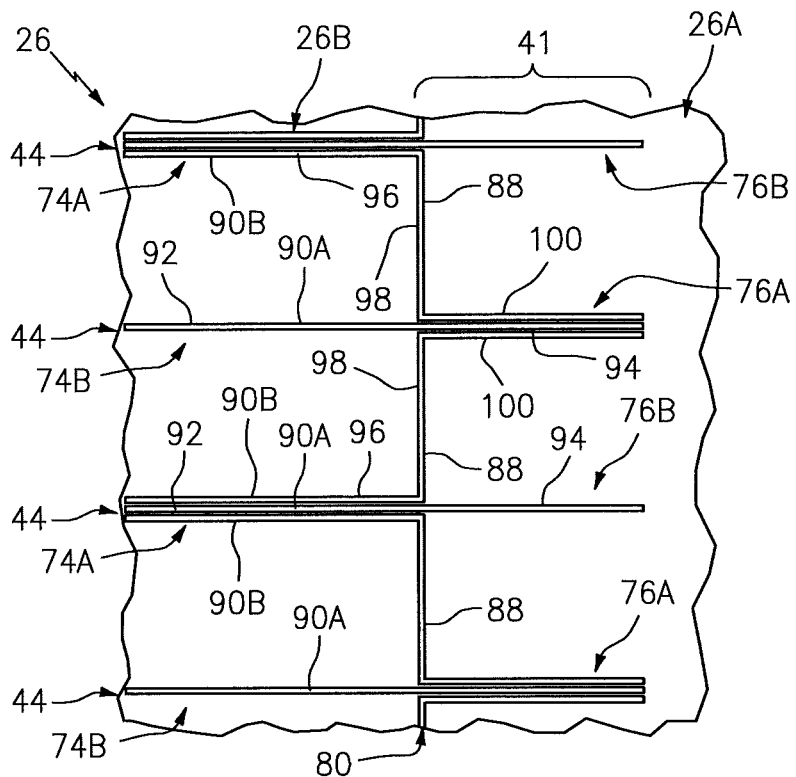

Referring to FIGS. 14 and 15, one or more of the walls 44 may each be configured to form a laterally extending section 88 of the perimeter wall 80, which perimeter wall 80 may wrap substantially around a perimeter of the second core structure 26A. For example, each wall 44 of FIGS. 14 and 15 is configured from one or more plies 90A and 90B (generally referred to as 90 below) of material. Each ply 90A of material is configured with a ply base 92 and a ply projection 94. Each ply 90B of material is configured with a ply base 96, a lateral jog 98 and a ply projection 100. The ply bases 92 and 96 singularly or collectively form the wall base 74. The ply projections 94 and 100 singularly or collectively form the projection 76. The lateral jog 98 extends laterally between and is connected to the respective ply base 96 and the ply projection 100; thus, the lateral jog 98 extends laterally between and is connected to the respective base 74 and the projection 76. The lateral jog 98 thereby laterally caps off/terminates a respective array 52 of the cavities 50 (not shown in FIGS. 14 and 15) to form the laterally extending section 88 of the perimeter wall 80. The projection 76 then projects longitudinally out from the lateral jog 98 and into the first core structure 26A as described above.

In the specific embodiment of FIG. 14, each base 74 includes two plies 90 of material and each projection 76 includes two plies 90 of material. Each lateral jog 98 includes a single ply 90B of material. In the specific embodiment of FIG. 15, each base 74A includes three plies 90 of material and each projection 76A includes three plies 90 of material. Each base 74B includes a single ply 90A of material and each projection 76B includes a single ply 90A of material, where the bases 74B are interdisposed with the bases 74A and the projections 76B are interdisposed with the projections 76A. Each lateral jog 98 also includes a single ply 90B of material. The present disclosure, of course, is not limited to the foregoing number or arrangement of plies 90 of material.

Figure 16:
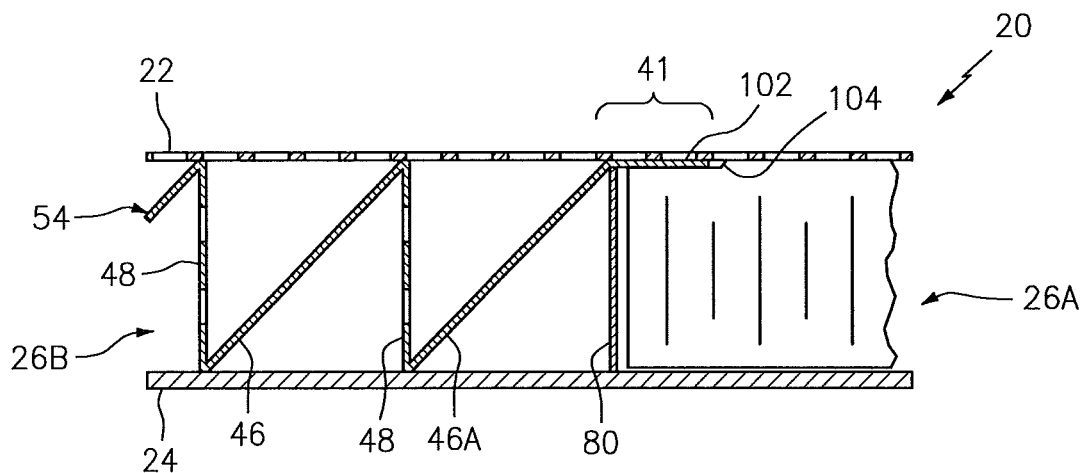
Figure 17:
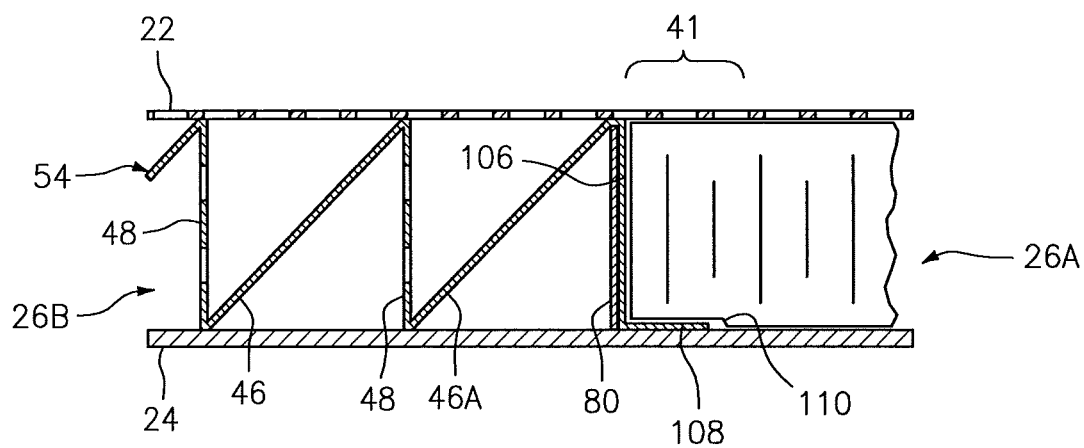
Figure 18:
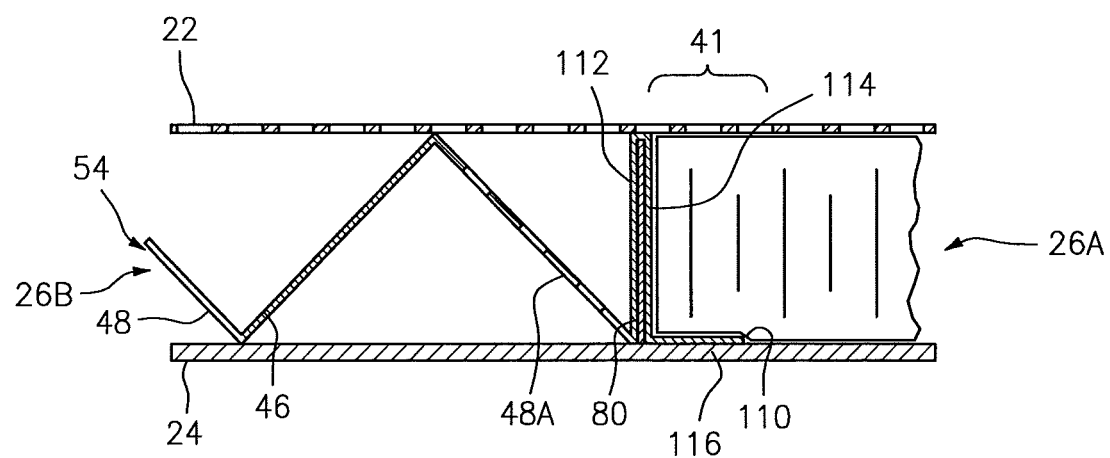

In the embodiments of FIGS. 16-18, the core components 72 projecting into and/or along the first core structure 26A are configured as the corrugated ribbons 54. For example, referring to FIG. 17, one or more of the corrugated ribbons 54 each includes a longitudinal projection 102. This projection 102 is connected to a respective end baffle 46A, and projects longitudinally out from that baffle 46A and along and/or into the first core structure 26A. In particular, the projection 102 of FIG. 16 is arranged (e.g., nested) in a shelf 104 formed in a side of the first core structure 26A. The projection 102 is thereby sandwiched and attached (e.g., bonded) vertically between the first core structure 26A and the first skin 22.

Referring to FIG. 17, one or more of the corrugated ribbons 54 each includes a vertical jog 106 and a longitudinal projection 108. The jog 106 is connected to a respective end baffle 46A, and projects vertically out from that baffle 46A towards the second skin 24 and to the projection 108. The jog 106 is arranged on the outside of the perimeter wall 80 such that the perimeter wall 80 is longitudinally between the jog 106 and the respective end baffle 46A. The projection 108 is connected to the jog 106, and projects longitudinally out from the jog 106 and along and/or into the first core structure 26A. In particular, the projection 108 of FIG. 17 is arranged in a shelf 110 formed in a side of the first core structure 26A. The projection 108 is thereby sandwiched and attached (e.g., bonded) vertically between the first core structure 26A and the second skin 24.

Referring to FIG. 18, one or more of the corrugated ribbons 54 each includes a vertical first jog 112, a vertical second jog 114 and a projection 116. The first jog 112 is connected to a respective end septum 48A, and projects vertically out from that septum 48A towards the first skin 22 and to the second jog 114. The second jog 114 is connected to the second jog 114, and projects vertically out from that second jog 114 towards the second skin 24 and to the projection 116. The first jog 112 is arranged on the inside of the perimeter wall 80 and the second jog 114 is arranged on the outside of the perimeter wall 80 such that the perimeter wall 80 is (e.g., sandwiched) longitudinally between the jogs 112 and 114. The projection 116 is connected to the second jog 114, and projects longitudinally out from the second jog 114 and along and/or into the first core structure 26A. In particular, the projection 116 of FIG. 18 is arranged in the shelf 110 of the first core structure 26A. The projection 116 is thereby sandwiched and attached (e.g., bonded) vertically between the first core structure 26A and the second skin 24.

Figure 19:
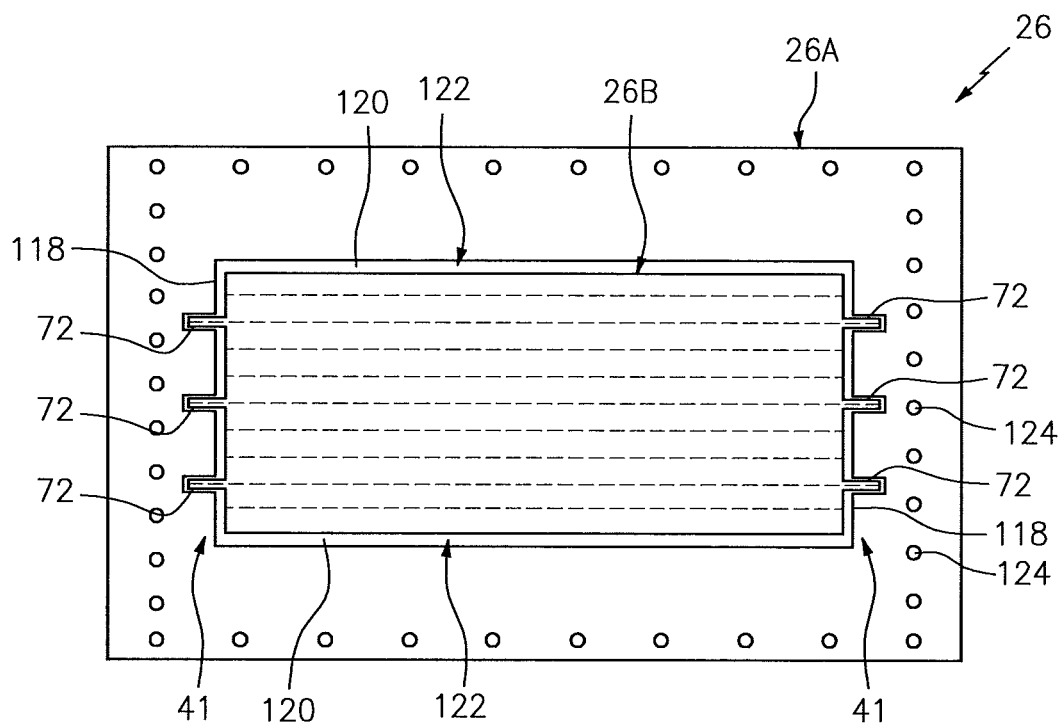
FIG. 19 is a schematic illustration of a multi-segment core structure which includes a plurality of splice joints and a plurality of butt joints.
Figure 20:
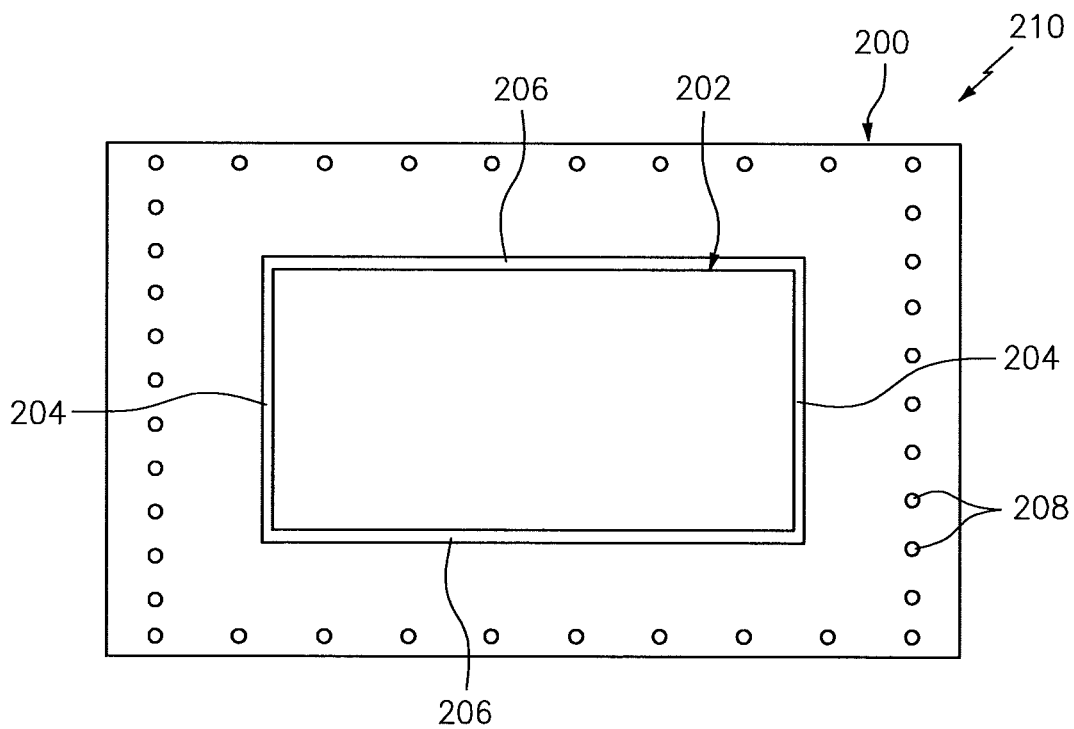
FIG. 20 is a schematic illustration of a multi-segment core structure which includes a plurality of butt joints.

FIG. 19 illustrates another embodiment of the multi-segment core structure 26. In this embodiment, the first core structure 26A includes an aperture, which extends vertically through a central portion of the first core structure 26A. The second core structure 26B is disposed within and thereby plugs the aperture. Each longitudinal end 118 of the second core structure 26B is attached to the first core structure 26A via a splice joint 41 as described above. Each lateral end 120 of the second core structure 26B may be attached to the first core structure 26A via a bonded butt joint 122. Since the splice joint 41 may be operable to transfer relatively high loads between the structures 26A and 26B, the longitudinal ends 118 of the second core structure 26B may be positioned relatively close to one or more fasteners 124 that secure the panel 20 to another structure. By contrast, where core structures 200 and 202 are only attached via butt joints as shown in FIG. 20, each end 204 and 206 of the core structure 202 must be disposed relatively far from fasteners 208 securing the panel to another structure. Thus, the core structure 26 of FIG. 19 may include a larger area of low frequency sound attenuating core structure (e.g., second core structure 26B) than the panel 210 of FIG. 20.

Figure 21:
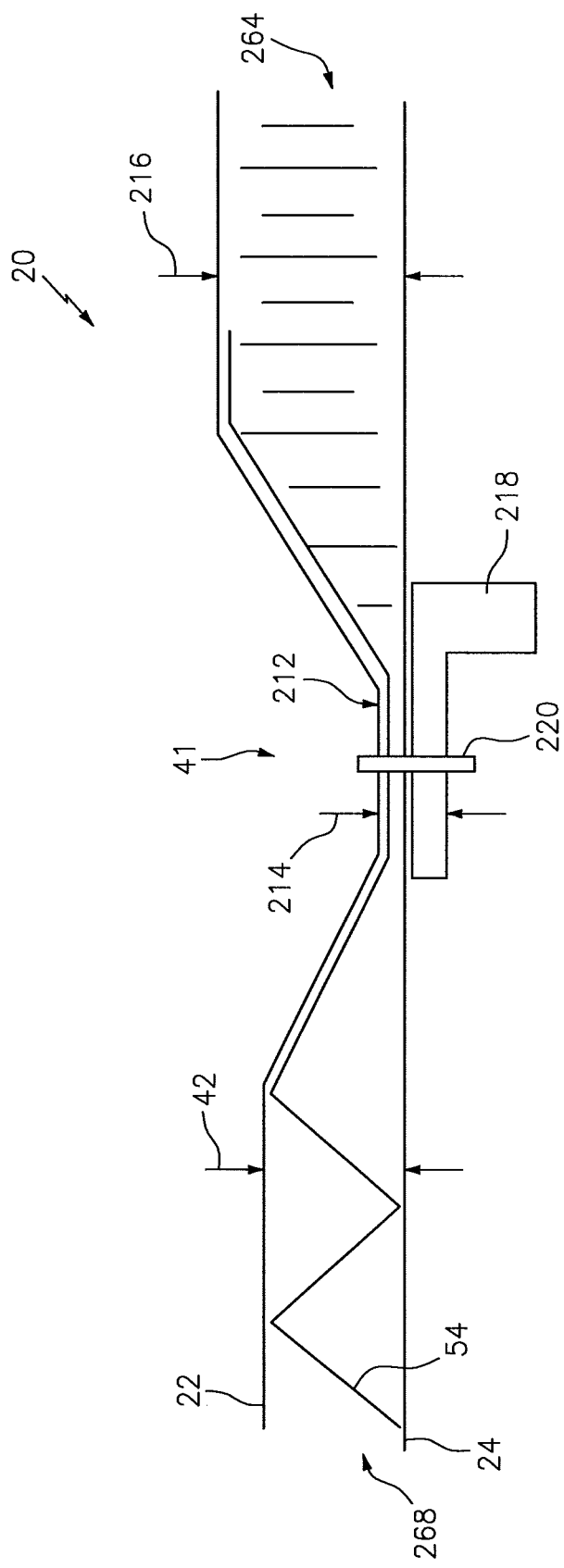
FIG. 21 is a schematic illustration of another splice joint between the first core structure and the second core structure.
Figure 22:
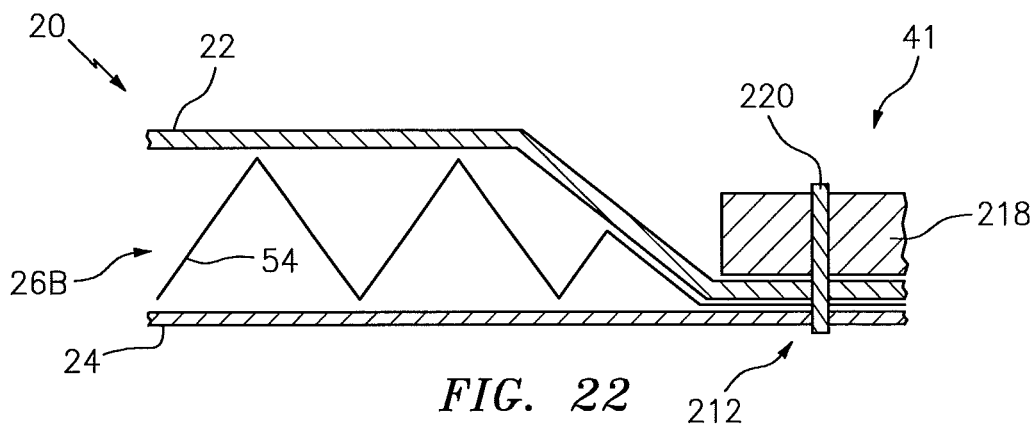
FIGS. 22-25 are partial schematic illustrations of alternative splice joints.
Figure 23:
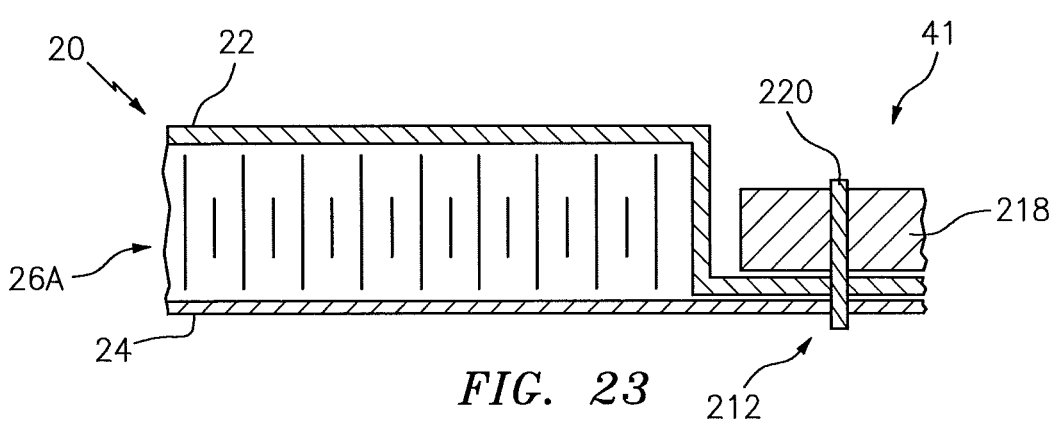
Figure 24:
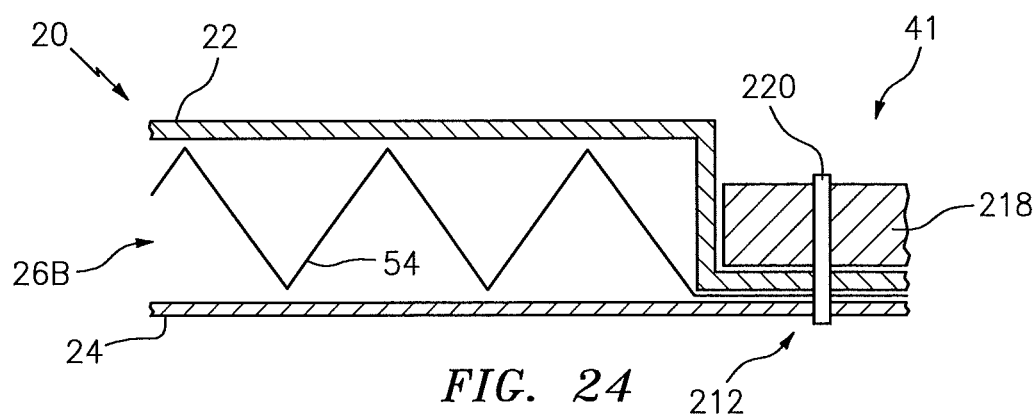
Figure 25:
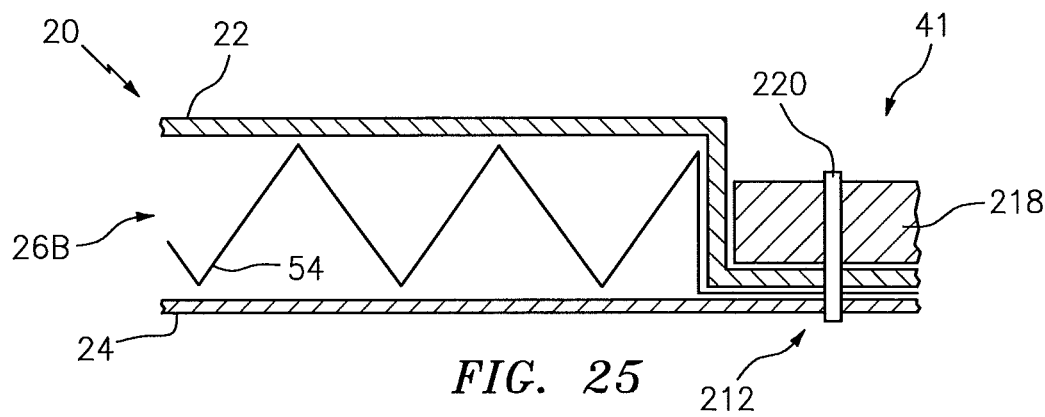

In some embodiments, referring to FIG. 21, the splice joint 41 between the core structures 26A and 26B may have an intermediate segment 212 with a vertical thickness 214 that is less than vertical thicknesses 42 and 216 of the core structures 26A and 26B. For example, the ends the core structures 26A and 26B may be ramped down (e.g., tapered or stepped down) or otherwise closed out to a point where, for example, there are no cavities 43, 50 (or very small cavities) between the first and the second skins 22 and 24. In the specific embodiment of FIG. 21, for example, a flat portion of the ribbon 54 material is arranged between and may directly contact the first and the second skins 22 and 24. To further reinforce this splice joint 41, an element 218 such as, but not limited to, a support, frame or backing plate may be secured to the sandwiched elements via one or more fasteners 220. This element 218 may also or alternatively be used to securing the panel 20 to another component. Another embodiment of a tapered closeout is shown in FIG. 22. In other embodiments, of course, one or both of the ends of the core structures 26A and 26B may be closed out without a taper adjacent the intermediate segment as shown, for example, in FIGS. 23-25.

In some embodiments, the first core structure 26A may have a different (e.g., smaller or larger) vertical thickness than the second core structure 26B as shown in FIG. 21. However, in other embodiments, the core structures 26A and 26B may have substantially uniform (the same) vertical thicknesses as shown in FIG. 1.

The splice joint 41 is generally described above as connecting together two dissimilar core structures 26A and 26B. However, in other embodiments, the splice joint 41 may be between two similar core structures; e.g., between two core structures 26A or between two core structures 26B. In the case where the splice joint 41 is between two core structures 26B, the ribbon 54 and/or the wall 44 of each core structure 26B may extend into the other core structure 26B. Alternatively, the ribbon 54 and/or the wall 44 of only one of the core structures 26B may extend into the other core structure 26B. In this case, the ribbons 54 and/or walls 44 of the core structures 26B may overlap or the ends thereof may be butted against one another. The present disclosure, of course, is not limited to the foregoing exemplary splice joint 41 configurations.

Figure 26:
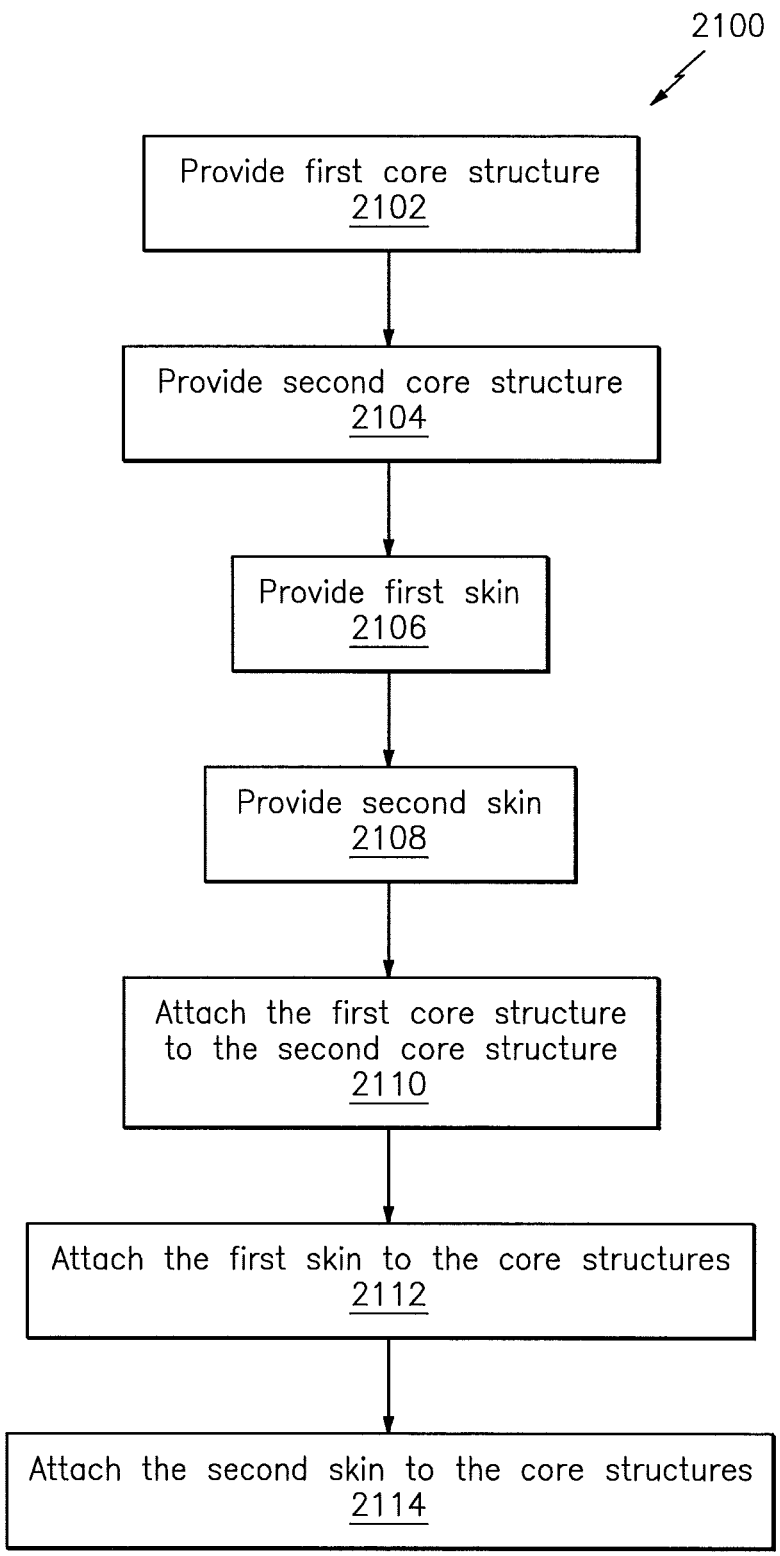
FIG. 26 is a flow diagram of a method for forming a structural panel.

FIG. 26 is a flow diagram of a method 2100 for forming a structural panel such as the panel 20 described above. In step 2102, the first core structure 26A is provided. The first core structure 26A, for example, may be manufactured using known manufacturing techniques from materials such as, but not limited to, metal, polymer (e.g., thermoplastic or thermoset), fiber reinforced matrix (e.g., fiberglass composite, carbon fiber composite, aramid fiber composite, etc.), or a combination thereof.

In step 2104, the second core structure 26B is provided. The second core structure 26B, for example, may be manufactured using known manufacturing techniques from materials such as, but not limited to, metal, polymer (e.g., thermoplastic or thermoset), fiber reinforced matrix (e.g., fiberglass composite, carbon fiber composite, aramid fiber composite, etc.), or a combination thereof.

In step 2106, the first skin 22 is provided. The first skin 22, for example, may be manufactured using known manufacturing techniques from materials such as, but not limited to, metal, polymer (e.g., thermoplastic or thermoset), fiber reinforced matrix (e.g., fiberglass composite, carbon fiber composite, aramid fiber composite, etc.), or a combination thereof.

In step 2108, the second skin 24 is provided. The second skin 24, for example, may be manufactured using known manufacturing techniques from materials such as, but not limited to, metal, polymer (e.g., thermoplastic or thermoset), fiber reinforced matrix (e.g., fiberglass composite, carbon fiber composite, aramid fiber composite, etc.), or a combination thereof.

In step 2110, the second core structure 26B is attached to the first core structure 26A such that there is at least one (e.g., bonded) splice joint 41 (or multiple splice joints 41) between the structures 26A and 26B. There may also be one or more other types of joints (e.g., bonded butt joint(s)) between the structures 26A and 26B; e.g., see FIG. 19.

In step 2112, the first skin 22 is bonded to the first core structure 26A and the second core structure 26B.

In step 2114, the second skin 24 is bonded to the first core structure 26A and the second core structure 26B.

While various embodiments of the present invention have been disclosed, it will be apparent to those of ordinary skill in the art that many more embodiments and implementations are possible within the scope of the invention. For example, the present invention as described herein includes several aspects and embodiments that include particular features.

Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A structural panel, comprising:
a first core structure; and
a second core structure comprising a plurality of core components that include a corrugated ribbon, a first wall and a second wall, the corrugated ribbon including a plurality of baffles and a plurality of porous septums, the baffles and the porous septums laterally between and connected to the first wall and the second wall, and each of the porous septums longitudinally between a respective adjacent pair of the baffles;
a first of the core components projecting longitudinally at least one of into or along the first core structure at a splice joint between the first core structure and the second core structure.

2. The structural panel of claim 1, wherein the first core structure has a different configuration than the second core structure.

3. The structural panel of claim 1, wherein the second core structure is configured with a plurality of resonance chambers, each of the resonance chambers extends laterally between the first wall and the second wall, each of the resonance chambers extends longitudinally between a respective adjacent pair of the baffles, and each of the resonance chambers is divided into a pair of sub-cavities by a respective one of the porous septums.

4. The structural panel of claim 1, further comprising a perforated first skin and a second skin, the first core structure and the second core structure each disposed vertically between and attached to the perforated first skin and the second skin.

5. The structural panel of claim 1, wherein the first of the core components comprises the first wall.

6. The structural panel of claim 5, wherein the first wall is disposed within one or more cavities of the first core structure, and the first wall is bonded to one or more components of the first core structure that at least partially form the one or more cavities.

7. The structural panel of claim 5, wherein
the core components further include a perimeter wall;
the first wall comprises a lateral jog and a longitudinal projection;
the lateral jog forms a laterally extending section of the perimeter wall; and
the longitudinal projection projects longitudinally into the first core structure.

8. The structural panel of claim 5, wherein the second wall projects longitudinally into the first core structure at the splice joint.

9. The structural panel of claim 5, wherein the second wall does not project into the first core structure at the splice joint.

10. The structural panel of claim 9, wherein
the core components further include a second corrugated ribbon and a third wall that projects longitudinally into the first core structure at the splice joint;
the second corrugated ribbon includes a plurality of second baffles and a plurality of second porous septums;
the second baffles and the second porous septums are laterally between and connected to the second wall and the third wall; and
each of the second porous septums is longitudinally between a respective adjacent pair of the second baffles.

11. The structural panel of claim 5, wherein
the first wall projects longitudinally into the first core structure for a first distance;
the core components further include a plurality of parallel walls that include the first wall and the second wall; and
one of the parallel walls projects longitudinally into the first core structure at the splice joint for a second distance that is different than the first distance.

12. The structural panel of claim 5, wherein
the first wall projects longitudinally into the first core structure for a first distance;
the core components further include a plurality of parallel walls that include the first wall and the second wall; and
one of the parallel walls projects longitudinally into the first core structure at the splice joint for a second distance that is equal to the first distance.

13. The structural panel of claim 5, wherein the first wall comprises one or more cantilevered branches disposed within the first core structure.

14. The structural panel of claim 1, wherein the first of the core components comprises the corrugated ribbon.

15. The structural panel of claim 14, wherein
the corrugated ribbon further includes a projection;
the projection projects out from one of the baffles or one of the septums; and
the projection extends longitudinally along the first core structure.

16. The structural panel of claim 14, wherein
the core components further include a perimeter wall;
the corrugated ribbon further includes a jog and a projection;
the jog extends vertically along the perimeter wall and is connected to one of the baffles or one of the septums; and
the projection projects longitudinally out from the jog and along the first core structure.

17. The structural panel of claim 14, wherein
the core components further include a perimeter wall;
the corrugated ribbon further includes a first jog, a second jog and a projection;
the first jog extends vertically along a first side of the perimeter wall and is connected to one of the baffles or one of the septums;
the second jog extends along a second side of the perimeter wall and is connected between the first jog and the projection; and
the projection projects longitudinally out from the second jog and along the first core structure.

18. The structural panel of claim 1, wherein an aperture extends vertically through a central portion of the first core structure, and the second core structure is disposed within the aperture.

19. A method for forming a structural panel, comprising:
providing a first core structure;
providing a second core structure comprising a plurality of core components that include a corrugated ribbon, a first wall and a second wall, the corrugated ribbon including a plurality of baffles and a plurality of porous septums, the baffles and the porous septums laterally between and connected to the first wall and the second wall, and each of the porous septums longitudinally between a respective adjacent pair of the baffles; and
attaching the second core structure to the first core structure at a splice joint, wherein a first of the core components projects longitudinally at least one of into or along the first core structure.

20. The method of claim 19, further comprising:

bonding a perforated first skin to the first core structure and the second core structure; and bonding a second skin to the first core structure and the second core structure, wherein the first core structure and the second core structure are vertically between the perforated first skin and the second skin.

* * * * *